(12) United States Patent
Schneider

(10) Patent No.: US 11,560,947 B2
(45) Date of Patent: Jan. 24, 2023

(54) PISTON WITH KEYSTONE SECOND RING GROOVE FOR HIGH TEMPERATURE INTERNAL COMBUSTION ENGINES

(71) Applicant: TENNECO INC., Lake Forest, IL (US)

(72) Inventor: Norbert G. Schneider, Ann Arbor, MI (US)

(73) Assignee: Tenneco Inc., Lake Forest, IL (US)

( * ) Notice: Subject to any disclaimer, the term of this patent is extended or adjusted under 35 U.S.C. 154(b) by 4 days.

(21) Appl. No.: 17/179,471

(22) Filed: Feb. 19, 2021

(65) Prior Publication Data

US 2021/0172523 A1 Jun. 10, 2021

Related U.S. Application Data

(63) Continuation of application No. 14/286,328, filed on May 23, 2014, now abandoned.

(51) Int. Cl.
*F16J 9/12* (2006.01)
*F02F 3/00* (2006.01)

(52) U.S. Cl.
CPC ...... *F16J 9/12* (2013.01); *F02F 3/00* (2013.01); *F02F 3/0015* (2013.01); *F02F 2200/00* (2013.01); *Y10T 29/49266* (2015.01)

(58) Field of Classification Search
CPC ........ F16J 9/12; F16J 9/20; F16J 1/005; F02F 3/00; F02F 3/0015; F02F 3/003; F02F 3/16; F02F 3/20; F02F 3/22; F02F 3/26; F02F 2003/0061; F02F 2200/00; F02B 23/06; F01P 3/06; F01P 3/10
See application file for complete search history.

(56) References Cited

U.S. PATENT DOCUMENTS

| 3,195,901 | A | * | 7/1965 | Mercier | F16J 15/3236 |
|---|---|---|---|---|---|
| | | | | | 277/438 |
| 6,588,320 | B2 | * | 7/2003 | Gaiser | B23P 15/10 |
| | | | | | 92/231 |
| 6,840,155 | B2 | * | 1/2005 | Ribeiro | B21K 1/18 |
| | | | | | 92/186 |
| 6,862,976 | B2 | * | 3/2005 | Gaiser | F02F 3/22 |
| | | | | | 92/186 |

(Continued)

FOREIGN PATENT DOCUMENTS

JP 60206959 A * 10/1985 ............ F02F 3/003

*Primary Examiner* — Grant Moubry
(74) *Attorney, Agent, or Firm* — Robert L. Stearns; Dickinson Wright, PLLC

(57) ABSTRACT

A piston for a high temperature internal combustion engine is provided. The piston includes an upper wall, base wall, outer rib, and inner rib defining a cooling chamber therebetween, and a plurality of ring grooves formed in the outer rib. Only the second ring groove is formed with the keystone cross-section, and all of the other ring grooves are formed with the conventional rectangular cross-section. Thus, the piston can be formed with low manufacturing costs and can also provide exceptional performance when used in high temperature combustion engines, wherein the temperature at the first ring groove is greater than 280° C., and thus prevents carbon from depositing or burns off any carbon deposits, but the temperature at the second ring groove is between 200° C. and 280° C., in which case carbon deposits can form and cause the piston ring to stick.

14 Claims, 2 Drawing Sheets

(56) References Cited

U.S. PATENT DOCUMENTS

| | | | | |
|---|---|---|---|---|
| 7,762,178 | B2* | 7/2010 | Scharp | F02F 3/22 |
| | | | | 92/186 |
| 8,065,985 | B2* | 11/2011 | Schneider | F02F 3/003 |
| | | | | 123/193.1 |
| 8,550,052 | B2* | 10/2013 | Keller | F02F 3/22 |
| | | | | 123/193.6 |
| 8,616,161 | B2* | 12/2013 | Scharp | B23P 15/10 |
| | | | | 123/41.35 |
| 8,631,573 | B2* | 1/2014 | Scharp | B23P 15/10 |
| | | | | 29/888.04 |
| 8,635,982 | B2* | 1/2014 | Scharp | F02F 3/22 |
| | | | | 123/193.6 |
| 8,807,109 | B2* | 8/2014 | Muscas | F02F 3/003 |
| | | | | 123/193.6 |
| 9,163,579 | B2* | 10/2015 | Aharonov | F02F 3/00 |
| 9,169,800 | B2* | 10/2015 | Matsuo | F02F 3/10 |
| 9,216,474 | B2* | 12/2015 | Wandrie, III | B23K 20/129 |
| 9,243,709 | B2* | 1/2016 | Lapp | B23P 15/10 |
| 9,670,871 | B2* | 6/2017 | Ottliczky | F02F 3/22 |
| 2006/0037471 | A1* | 2/2006 | Zhu | F02F 3/22 |
| | | | | 92/173 |
| 2007/0079775 | A1* | 4/2007 | Lin | F02F 3/003 |
| | | | | 123/41.35 |
| 2012/0304956 | A1* | 12/2012 | Wang | F02F 3/003 |
| | | | | 123/193.6 |
| 2014/0083390 | A1* | 3/2014 | Azevedo | F16J 1/005 |
| | | | | 123/193.6 |
| 2014/0102294 | A1* | 4/2014 | Klein | F02F 3/22 |
| | | | | 92/208 |

* cited by examiner

PISTON WITH KEYSTONE SECOND RING GROOVE FOR HIGH TEMPERATURE INTERNAL COMBUSTION ENGINES

This U.S. Continuation application claims priority to U.S. Utility application Ser. No. 14/286,328, filed May 23, 2014, and is incorporated herein by reference.

BACKGROUND OF THE INVENTION

1. Field of the Invention

This invention relates generally to pistons for internal combustion engines, and methods for manufacturing the same.

2. Related Art

Pistons of internal combustion engines, such as heavy duty diesel pistons, are exposed to extremely high temperatures during operation, especially along the upper crown of the piston. Such pistons typically include a plurality of ring grooves formed along the outermost surface and each containing a piston ring which slides along the cylinder wall as the piston reciprocates. The piston rings assist in the transfer of heat away from the piston to the cylinder wall. The piston rings can also seal the combustion chamber and limit oil consumption. Oftentimes, during engine operation, the temperature of the first (uppermost) ring groove exceeds 200° C., in which case carbon deposits tend to form along the ring groove or piston ring. Over time, the carbon deposits can cause the piston ring to stick to the ring groove, which hinders its ability to transfer heat, seal the combustion chamber, and limit oil consumption.

Accordingly, to prevent the piston ring from sticking during prolonged use of the piston in the high temperature combustion engine, the first ring groove can be formed with a trapezoidal cross-section, also referred to as a keystone cross-section, rather than a conventional rectangular cross-section. A keystone piston ring having a matching trapezoidal cross-section is disposed in the keystone ring groove. The angled surfaces of the keystone ring groove and keystone piston ring prevent the piston ring from sticking. If the piston is designed for use in an engine application having even higher temperature loads, then the second ring groove is also formed with the keystone cross-section. However, use of the keystone ring groove is limited as it is significantly more expensive to manufacture than the conventional rectangular groove.

SUMMARY OF THE INVENTION

One aspect of the invention provides a piston for high temperature internal combustion engines. The piston includes an upper wall surrounding a center axis and presenting a combustion surface, an outer rib extending from the upper wall to a base wall, and an inner rib disposed between the outer rib and the center axis and extending from the upper wall to the base wall. The upper wall, ribs, and base wall present a cooling chamber therebetween. The outer rib presents an outer surface and includes a plurality of ring grooves. Each of the ring grooves includes a pair of side flanks extending inwardly from the outer surface to a base flank. The first ring groove, which is the ring groove closest to the combustion surface, has a rectangular cross-section. Thus, the side flanks of the first ring groove extend perpendicular to the base flank of the first ring groove. The second ring groove, which is the ring groove second closest to the combustion surface, has a keystone cross-section. Thus, at least one of the side flanks of the second ring groove is disposed at an angle greater than 90 degrees relative to the base flank of the second ring groove.

The piston of the present invention with the rectangular first ring groove and the keystone second ring groove is designed for engine applications wherein the temperature of the first ring groove exceeds 280° C. and thus is so hot that carbon does not deposit on the ring groove, or burns off. At such high temperatures, ring sticking is not an issue and thus the first ring groove does not require the keystone cross-section. However, in these high temperature engine applications, the temperature at the second ring groove is typically between 200° C. and 280° C. and thus carbon can deposit on the second ring groove causing the piston ring to stick. Accordingly, the second ring groove is formed with the keystone cross-section to prevent the piston ring from sticking. The piston can provide exceptional performance during operation of the high temperature combustion engine and can be formed with low manufacturing costs since the keystone cross-section is not formed in the first ring groove. In addition, the rectangular first ring groove provides improved sealing of combustion gases and oil along the cylinder wall, compared to pistons formed with a keystone first ring groove.

The invention also provides a method of manufacturing the piston. The method includes providing the piston with the upper wall, the base wall, the outer rib, and the inner rib presenting the cooling chamber therebetween. The method further includes forming the first ring groove and the second ring groove in the outer rib. This step includes forming each ring groove with the pair of side flanks extending inwardly from the outer surface to the base flank, wherein the side flanks of the first ring groove extend perpendicular to the base flank, and at least one of the side flanks of the second ring groove extend at an angle greater than 90 degrees relative to the base flank.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
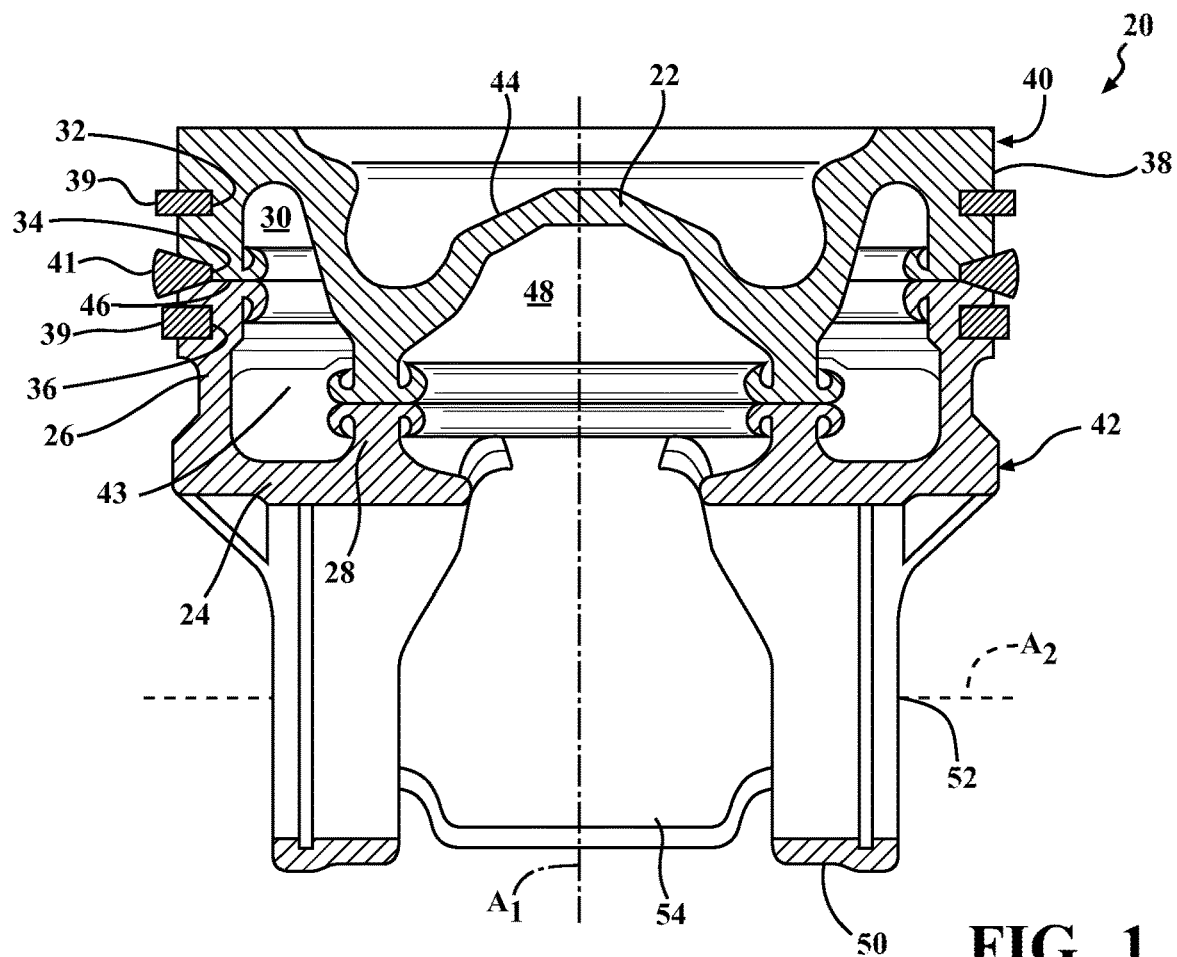
FIG. 1 is a side cross-sectional view of a piston including an upper part welded to a lower part according to one exemplary embodiment of the invention.
Figure 2:
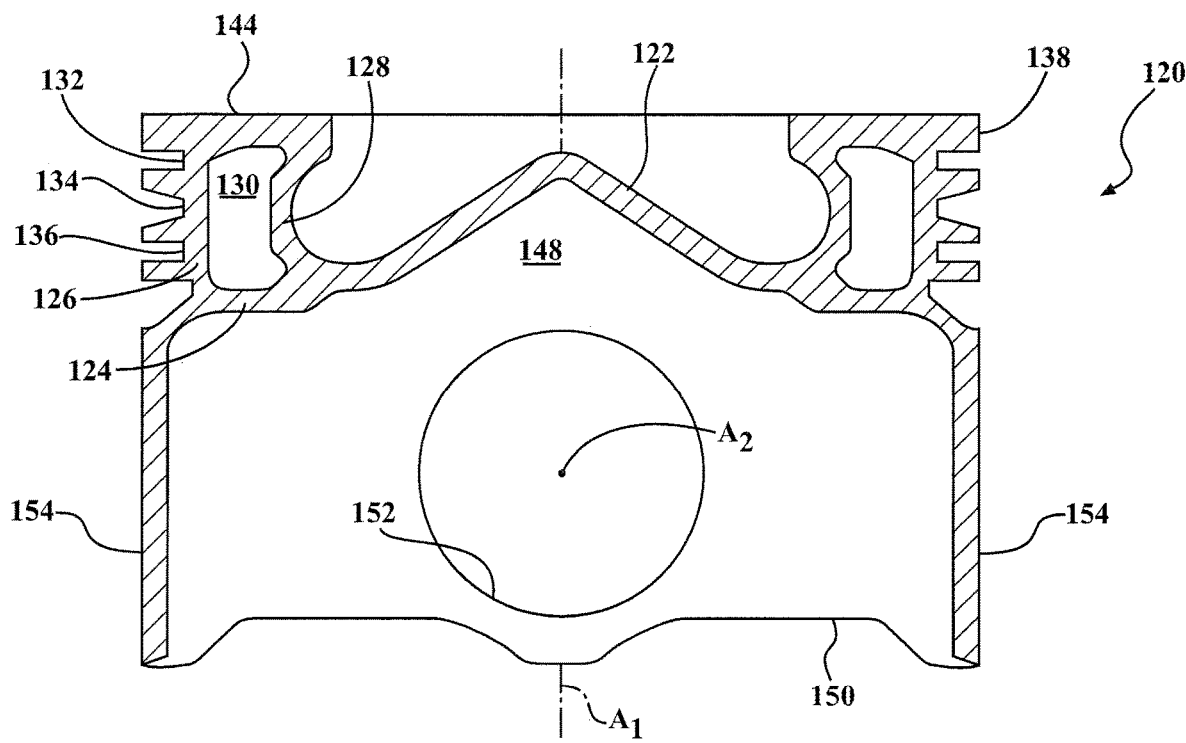
FIG. 2 is a side cross-sectional view of a single-piece cast piston according to another exemplary embodiment of the invention.

Referring to the Figures, wherein like numerals indicate corresponding parts throughout the several views, an exemplary piston 20, 120 for a high temperature internal combustion engine is generally shown in FIGS. 1 and 2. The piston 20, 120 includes an upper wall 22, 122, a base wall 24, 124, an outer rib 26, 126, and an inner rib 28, 128 defining a cooling chamber 30, 130 extending circumferentially around a center axis $A_1$. A plurality of ring grooves 32, 132, 34, 134, 36, 136, are formed in an outer surface 38, 138 of the outer rib 26, 126 each for retaining a piston ring 39, 139, 41, 141. During engine operation, the piston temperature at the first ring groove 32, 132 can exceed 280° C. and thus so hot that carbon does not deposit on the first ring groove 32, 132, or burns off. Accordingly, the first ring groove 32, 132 does not require a keystone cross-section and is formed with a conventional rectangular cross-section. The temperature of the piston 20, 120 at the second ring groove 34, 134, however, can be between 200° C. and 280° C., in which case carbon deposits can form on the second ring groove 34, 134. Thus, the second ring groove 34, 134 is formed with the keystone cross-section to prevent the piston ring 41, 141 from sticking. Preferably, only the second ring groove 34, 134 is formed with the keystone cross-section. Thus, the piston 20, 120 of the present invention can provide exceptional performance and can be formed with reduced manufacturing costs compared to pistons formed with the keystone first and keystone second ring grooves, and in some cases even more than two keystone ring grooves.

The piston 20, 120 of the present invention can comprise various different designs. For example, the piston 20, 120 can be a two-piece welded piston, such as a friction welded, laser welded, electron beam welded, or induction welded piston. The piston 20, 120 can also be a single-piece piston 20, 120, such as a cast piston. However, each piston design includes the rectangular first ring groove 32, 132 and the keystone second ring groove 34, 134.

The exemplary piston 20 of FIG. 1 is a friction-welded heavy duty piston including an upper piston part 40 friction welded to a lower piston part 42. The upper piston part 40 is formed of a metal material, such as steel, cast iron, aluminum, or another type of metal material. The upper piston part 40 extends annularly around the center axis $A_1$ and longitudinally along the center axis $A_1$ from the upper wall 22 to a first upper joining surface and a second upper joining surface. The upper wall 22 of the upper piston part 40 includes a combustion surface 44 presenting a bowl rim extending annularly around the center axis $A_1$ and a combustion bowl extending inwardly and downwardly from the bowl rim toward the center axis $A_1$. The combustion surface 44 of the upper wall 22 presents an apex at the center axis $A_1$ and is surrounded by the combustion bowl. During operation, the piston 20 reciprocates in a cylinder of the engine, and the combustion surface 44 together with the cylinder wall forms a combustion chamber containing a high temperature mixture of fuel and gas for ignition.

The upper piston part 40 includes an upper outer rib depending from the bowl rim of the upper wall 22 and extending annularly around the center axis $A_1$ and longitudinally along the center axis $A_1$ to the first upper joining surface. The upper outer rib presents an upper outer surface extending annularly around the center axis $A_1$ and facing away from the center axis $A_1$. The upper out rib forms a portion of the outer rib 26 of the finished friction-welded piston 20, and the upper outer surface forms a portion of the outer surface 38 of the finished friction-welded piston 20.

The upper piston part 40 also includes an upper inner rib disposed between the upper outer rib and the center axis $A_1$. The upper inner rib depends from the upper wall 22 beneath the combustion bowl and extends annularly around the center axis $A_1$ and longitudinally along the center axis $A_1$ to the second upper joining surface. The upper inner rib forms a portion of the inner rib 28 of the finished friction-welded piston 20. The joint of the friction weld is illustrated at 29 in FIG. 1A and includes weld curls 29a and 29b that extend from the plane of the joint in opposite directions. In the exemplary embodiment of FIG. 1, the first and second upper joining surfaces are offset from one another and each present a flat surface extending perpendicular to the center axis $A_1$. However, the upper ribs and the associated joining surfaces could present other geometries.

The lower piston part 42 of the friction-welded piston 20 is also formed of a metal material, which can be the same or different from the metal material of the upper piston part 40. The lower piston part 42 also extends annularly around the center axis $A_1$ and longitudinally along the center axis $A_1$. In the exemplary piston 20 of FIG. 1, the lower piston part 42 provides the base wall 24 which extends perpendicular to and surrounds the center axis $A_1$. A lower outer rib extends annularly around the center axis $A_1$ and upwardly from the base wall 24 to a first lower joining surface. The first lower joining surface of the lower piston part 42 and the first upper joining surface of the upper piston part 40 include a weld 46 therebetween. The lower outer rib also presents a lower outer surface extending annularly around the center axis $A_1$. The lower outer surface is aligned with the upper outer surface, and together those surfaces form the outer surface 38 of the finished friction-welded piston 20.

The lower piston part 42 also includes a lower inner rib disposed radially inwardly of the lower outer rib and spaced from the lower outer rib by the base wall 24. The lower inner rib extends annularly around the center axis $A_1$ and upwardly from the base wall 24 to a second lower joining surface. The second lower joining surface of the lower piston part 42 and the second upper joining surface of the upper piston part 40 also include the weld 46 therebetween. The lower inner rib and the upper inner rib together form the inner rib 28 of the finished friction-welded piston 20. In the exemplary embodiment of FIG. 1, the first and second lower joining surfaces are offset from one another and each present a flat surface extending perpendicular to the center axis $A_1$. However, the lower ribs and the associated joining surfaces could present other geometries.

As shown in FIG. 1, the welded inner rib 28, the welded outer rib 26, the upper wall 22, and the base wall 24 form the cooling chamber 30 therebetween. The cooling chamber 30 is closed and extends annularly around the center axis $A_1$. The cooling chamber 30 can be filled with a cooling fluid 43, such as oil, for transferring heat away from the upper wall 22 as the piston 20 reciprocates in the cylinder of the engine.

The welded inner rib 28 of the piston 20 surrounds the center axis $A_1$ and forms a cooling gallery 48 at the center axis $A_1$. In the exemplary embodiment of FIGS. 1 and 2, the cooling gallery 48 is closed along the upper wall 22 and opens in a direction facing away from the upper wall 22. Oil can be sprayed through the cooling gallery 48 to the underside of the upper wall 22 to further cool the piston 20. Alternatively, the cooling gallery 48 can be closed and thus no oil is sprayed into the cooling gallery 48.

The lower piston part 42 of the exemplary piston 20 of FIG. 1 also includes a pair of pin bosses 50 extending downwardly from the base wall 24 away from the upper piston part 40. Each of the pin bosses 50 presents a pin bore 52. The pin bores 52 are aligned with one another along a second axis $A_2$ which is perpendicular to the center axis $A_1$. The lower piston part 42 also includes a pair of skirt sections 54 each depending from the base wall 24 and spaced from one another by one of the pin bosses 50.

Figure 1A:
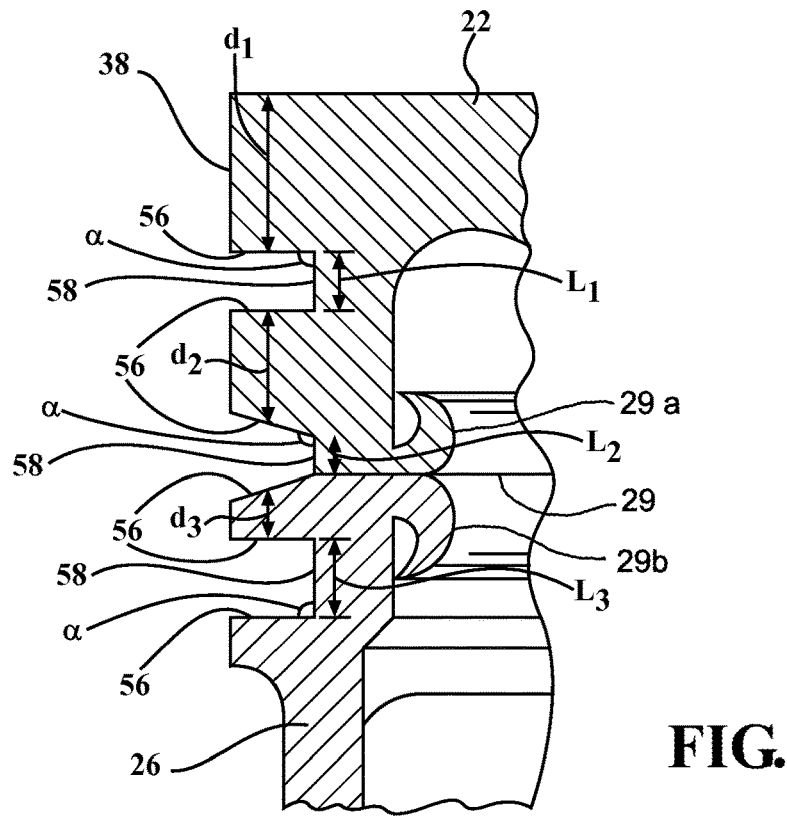
FIG. 1A is an enlarged view of the ring grooves of the piston of FIG. 1 without piston rings disposed in the ring grooves.

As shown in FIG. 1, the outer upper and lower ribs of the friction-welded piston 20 together provide the outer rib 28 with three ring grooves 32, 34, 36 formed therein. Preferably, no more than three ring grooves 32, 34, 36 are formed in the outer rib 28. Each of the ring grooves 32, 34, 36 extends radially inwardly from the outer surface 38 toward the center axis $A_1$ and circumferentially around the center axis $A_1$ for retaining a piston ring 39, 41. The three ring grooves 32, 34, 36 are axially aligned and spaced from one another by the outer surface 38 of the outer rib 26. All three ring grooves 32, 34, 36 are also preferably disposed axially along and radially outwardly of the cooling chamber 30. Each ring groove 32, 34, 36 includes a pair of side flanks 56 extending inwardly from the outer surface 38 to a base flank 58, as best shown in FIG. 1A.

The three ring grooves 32, 34, 36 formed in the outer rib 26 of the piston 20 of FIG. 1 include the first ring groove 32, which is the ring groove located closest to the combustion surface 44, having the rectangular cross-section. The side flanks 56 of the first ring groove 32 extend perpendicular to the base flank 58 to retain the piston ring 39 having a matching rectangular cross-section.

The second ring groove 34 formed in the outer rib 26, which is the ring groove located second closest to the combustion surface 44 and disposed between the first ring groove 32 and a third ring groove 36, has the keystone cross-section. Both side flanks 56 of the second ring groove 34 are disposed at an angle α greater than 90 degrees and not greater than 135 degrees relative to the base flank 58 for retaining the piston ring 41 having a matching keystone cross-section. Alternatively, the second ring groove 34 could have a semi-keystone cross-section, wherein only one of the side flanks 56 is disposed at the angle α greater than 90 degrees and not greater than 135 degrees relative to the base flank 58, while the other side flank 56 is disposed at an angle α equal to 90 degrees relative to the base flank 58. In the embodiment shown in FIGS. 1 and 1A, the upper side flank 56 and the base flank 58 of the second ring groove 34 are provided by the upper piston part 40 and the lower side flank 56 is provided by the lower piston part 42.

The third ring groove 36 shown in FIG. 1, which is the ring groove farthest from the combustion surface 44 and disposed between the second ring groove 34 and the base wall 24, also has the rectangular cross-section. The side flanks 56 of the third ring groove 36 extend perpendicular to the base flank 58 for retaining the piston ring 39 having a matching rectangular shape. Although the exemplary piston 20 of FIG. 1 is formed with three ring grooves 32, 34, 36, the piston 20 could alternatively include two ring grooves or more than three ring grooves, wherein the side flanks 56 of all of the ring grooves, except for the second ring groove 34, extend perpendicular to the base flank 58. Preferably, the second ring groove 34 is the only ring groove formed with the keystone cross-section.

As shown in FIGS. 1 and 1A, the base flanks 58 of the ring grooves 32, 34, 36 are preferably axially aligned with one another and extend parallel to the center axis $A_1$ and parallel to the outer surface 38 of the piston 20. As best shown in FIG. 1A, the base flanks 58 have a length L extending parallel to the center axis $A_1$ and from one of the side flanks 56 to the other side flank 56. In this exemplary embodiment, the length $L_3$ of the base flank 58 of the third ring groove 36 is greater than the length $L_2$ of the base flank 58 of the second ring groove 34, and greater than the length $L_1$ of the base flank 58 of the first ring groove 32. As also shown in this exemplary embodiment of FIG. 1A, the length $L_2$ of the base flank of the middle ring groove 34 is smaller than both the lengths $L_1$ and $L_3$ of the base flanks of the top ring groove 32 and bottom ring groove 36. In other words, $L_2$ is smaller than each of $L_1$ and $L_3$ as illustrated in FIG. 1A. The weld curls 29a and 29b overlap the flanks of the middle keystone groove 34 and the plane 29 of the friction weld extends through the base flank 58, and preferably at the bottom corner where the base flank 58 transitions into the bottom side flank 56. Each base flank 58 is preferably spaced from the cooling chamber 30 by a distance of not greater than three times the length L of the base flank 58.

Also best shown in FIG. 1A, the outer surface 38 of the piston 20 presents a first land extending a first distance $d_1$ from the combustion surface 44 to the first ring groove 32, a second land extending a second distance $d_2$ from the first ring groove 32 to the second ring groove 34, and a third land extending a third distance $d_3$ from the second ring groove 34 to the third ring groove 36. The first distance $d_1$ is preferably not greater than five times the length $L_1$ of the base flank 58 of the first ring groove 32. The second distance $d_2$ and the third distance $d_3$ are preferably not greater than three times the length $L_1$ of the base flank 58 of the first ring groove 32.

FIG. 2 illustrates the piston 120 of the present invention having an alternative design, but still including the rectangular first ring groove 132 and the keystone second ring groove 134. This piston 120 comprises a single-piece body formed by casting the metal material. The piston 120 includes the upper wall 122 presenting the combustion surface 144 with the bowl rim extending annularly around the center axis $A_1$ and the combustion bowl extending inwardly and downwardly from the bowl rim toward the center axis $A_1$. The combustion surface 144 of the upper wall 122 presents the apex at the center axis $A_1$ and is surrounded by the combustion bowl, like the piston 120 of FIG. 1.

The piston 120 of FIG. 2 also includes the outer rib 126 depending from the bowl rim of the upper wall 122 and extending annularly around the center axis $A_1$ and longitudinally along the center axis $A_1$ to the base wall 124. The outer rib 126 presents the outer surface 138 of the piston 120 with the ring grooves 132, 134, 136. The piston 120 also includes the inner rib 128 disposed between the outer rib 126 and the center axis $A_1$. The inner rib 128 depends from the upper wall 122 beneath the combustion bowl and extends annularly around the center axis $A_1$ and longitudinally along the center axis $A_1$ to the base wall 124. The inner rib 128, outer rib 126, upper wall 122, and base wall 124 together form the cooling chamber 130 therebetween. In this embodiment, the upper wall 122 forms the cooling gallery 148 at the center axis $A_1$. The piston 120 also includes the pair of pin bosses 150 extending downwardly from the base wall 124 and each presenting a pin bore 152, and the skirt sections 154 each depending from the base wall 124 and spaced from one another by one of the pin bosses 150.

Figure 2A:
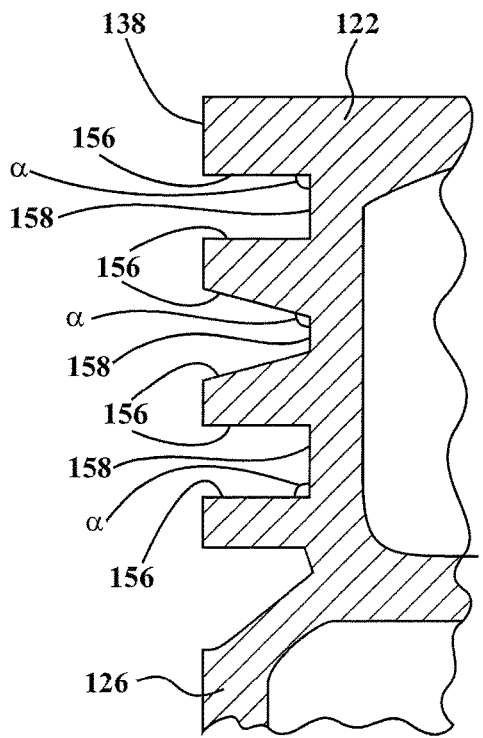
FIG. 2A is an enlarged view of the ring grooves of the piston of FIG. 2.

As shown in FIG. 2, the outer rib 126 of the single-piece cast piston 120 includes the three ring grooves 132, 134, 136, and no more than three ring grooves. Each of the ring grooves 132, 134, 136 extends radially inwardly from the outer surface 138 toward the center axis $A_1$ and circumferentially around the center axis $A_1$ for retaining a piston ring 139, 141. The three ring grooves 132, 134, 136 are axially aligned and spaced from one another by the outer surface 138 of the outer rib 126. All three ring grooves 132, 134, 136 are preferably disposed axially along and radially outwardly of the cooling chamber 130. As best shown in FIG. 2A, each ring groove 132, 134, 136 includes the side flanks 156 extending inwardly from the outer surface 138 to the base flank 158. Like the piston 120 of FIG. 1, the first ring groove 132 and the third ring groove 136 have the rectangular cross-section, and the second ring groove 134 is the only ring groove with the keystone cross-section. Although not shown, the piston 120 could alternatively include only the first and second ring grooves 132, 134, or more than three ring grooves, wherein the second ring groove 134 is the only ring groove with the keystone cross-section.

Another aspect of the invention provides a method of forming the piston 20, 120 including the rectangular first ring groove 32, 132 and the keystone second ring groove 34, 134. The method first includes providing the piston 20, 120 including the upper wall 22, 122 surrounding the center axis $A_1$ and presenting the combustion surface 44, 144; the outer rib 26, 126 extending from the upper wall 22, 122 to the base wall 24, 124 and presenting the outer surface 138, 138; and the inner rib 28, 128 extending from the upper wall 22, 122 to the base wall 24, 124 and disposed between the outer rib 26, 126 and the center axis $A_1$; and wherein the upper wall 22, 122, the ribs 26, 126, 28, 128 and the base wall 24, 124 present the cooling chamber 30, 130 therebetween. To form the two-piece piston 20 of FIG. 1, this first step includes providing the upper piston part 40 and the lower piston part 42, and then welding the upper piston part 40 to the lower piston part 42. To form the single-piece piston 120 of FIG. 2, this first step includes casting the metal material.

The method further includes forming the plurality of ring grooves 32, 132, 34, 134, 36, 136 in the outer rib 26, 126. This step can be performed by machining, for example after welding the upper piston part 40 to the lower piston part 42, or after casting the body of the piston 120. Alternatively, the ring grooves 132, 134, 136 can be formed during the casting process.

The step of forming the ring grooves 32, 132, 34, 134, 36, 136 includes forming each ring groove with the side flanks 56, 156 extending inwardly from the outer surface 38, 138 to the base flank 58, 158. This step also includes forming at least one of the side flanks 56, 156 of the second ring groove 34, 134 to extend at the angle α greater than 90 degrees and not greater than 135 degrees relative to the base flank 58, 158 of the second ring groove 34, 134. Preferably, the side flanks 56, 156 of the first ring groove 32, 132 and the side flanks 56, 156 of all other ring grooves except for the keystone second ring groove 34, 134 are formed to extend perpendicular to the base flank 58, 158. The method also preferably includes forming not more than three of the ring grooves 32, 132, 34, 134, 36, 136 in the outer rib 26, 126.

Obviously, many modifications and variations of the present invention are possible in light of the above teachings and may be practiced otherwise than as specifically described while within the scope of the appended claims.

What is claimed is:

1. A piston for an internal combustion engine, comprising:
a piston body having an upper part and a lower part;
an annular cooling gallery formed between the upper part and the lower part bounded by an outer annular wall portion of the gallery, an inner annular wall portion of the gallery, an upper wall portion of the gallery joining the inner and outer wall portions at an axially upper end of the gallery, and a bottom wall portion of the gallery joining the inner and outer wall portions at an axially lower end of the gallery;
the piston body including a combustion bowl in an upper surface of the of the piston body spaced radially inward of the annular inner wall portion of the gallery and extending axially below the upper end of the gallery;
the piston body including a ring belt and at least three ring grooves formed in a radially outward surface of the ring belt, including an upper ring groove, a middle ring groove and a lower ring groove;
the piston body including a piston skirt and a pair of pin bosses spaced from one another and formed with associated pin bores for receiving a wrist pin;
wherein the lower part of the piston body includes as a single piece structure the pin bores, the skirt and a portion of the cooling gallery;
wherein the upper and lower parts of the piston body have corresponding joining surfaces that are secured together by a weld joint;
wherein the weld joint extends through the ring belt;
wherein the middle ring groove includes upper and lower flanks and a base flank extending between the upper and lower flanks, and wherein the upper and lower flanks diverge away from one another from the base flank toward the outer surface of the ring belt; and
wherein the weld joint in the ring belt is disposed above the lower ring groove and below the upper ring groove; and
wherein the upper and lower ring grooves include upper and lower flanks, respectively, and base flanks, respectively, and wherein the base flank of the middle ring groove is smaller than the base flanks of both of the top ring groove or bottom ring groove.

2. The piston according to claim 1, wherein the weld joint in the ring belt is a friction weld joint.

3. The piston according to claim 2, wherein the weld joint in the ring belt is closer to the middle groove than it is to the top ring groove.

4. The piston according to claim 1, wherein the weld joint in the ring belt is spaced above the lower ring groove and spaced below the upper flank of the middle ring groove.

5. The piston according to claim 4, wherein the joining surface of upper and lower parts of the piston body includes an outer annular set of joining surfaces joined by an outer weld joint extending through the ring belt and a further set of annular inner joining surfaces joined by an inner weld joint that is spaced radially inwardly of the weld joint in the ring belt.

6. The piston according to claim 5, wherein the inner and outer weld joints lie in different planes.

7. The piston according to claim 6, wherein the inner weld joint is spaced axially below the outer weld joint.

8. The piston according to claim 7, wherein the inner weld joint is spaced axially below the combustion bowl.

9. The piston according to claim 1, wherein a piston ring is received in the middle groove and upper and lower surfaces of the piston ring diverge in a radially outward direction toward an outer surface of the ring.

10. A piston for an internal combustion engine, comprising:
an upper piston part having a combustion bowl recessed in a top surface of the upper piston part, an outer annular wall portion with a lower joining surface and an inner annular wall portion having a lower joining surface and being spaced radially inwardly of the outer annular wall portion;
a lower piston part having a pair of pin bosses formed with pin bores, a pair of skirt portions formed as one piece with the pin bosses, an outer annular wall portion having an upper joining surface, an inner annular wall portion having an upper joining surface and being spaced radially inwardly of the outer annular wall portion of the lower piston part;
a friction weld joint uniting the joining surfaces of the inner and outer wall portions of the upper and lower piston parts and defining an annular cooling gallery between radially spaced inner and outer wall portions, the combustion bowl and a bottom wall of the lower piston part;

a plurality of ring grooves formed in an outer surface of the united outer wall portions including an upper-most ring groove and a second ring groove spaced axially below the upper-most ring groove, and wherein the second ring groove comprises a keystone ring groove having a base flank spaced from the outer surface and upper and lower flanks that diverge from the base flank to the outer surface; and wherein the upper-most ring groove is generally rectangular in cross section and including a third ring groove that is generally rectangular in cross section and spaced below the keystone ring groove; and wherein each of the ring grooves has an upper flank and a lower flank that are joined by a base flank, and wherein the base flank of the keystone ring groove is smaller than the base flanks of both of the upper-most and third ring grooves.

11. The piston according to claim 10, wherein, the friction weld joint includes friction weld curls and wherein there is axial overlap of the friction weld curl with all flanks of the keystone ring groove.

12. The piston according to claim 11, wherein the plane of the outer friction weld joint extends through one of the flanks of the keystone ring groove.

13. The piston according to claim 10, wherein the friction weld joint includes an inner friction weld joint uniting the joining surfaces of the inner wall portions having a weld plane that is axially offset from the weld plane of the outer friction weld joint.

14. The piston according to claim 10, wherein the third ring groove is closer to the outer weld joint than is the upper-most ring groove.

* * * * *